United States Patent
Neubert et al.

(10) Patent No.: US 9,602,362 B2
(45) Date of Patent: Mar. 21, 2017

(54) EVALUATION OF USE OF A SERVICE AND/OR FUNCTION PROVIDED OR CALLED BY A WEB SERVICE

(71) Applicant: SCHNEIDER ELECTRIC AUTOMATION GMBH, Marktheidenfeld (DE)

(72) Inventors: Ralf Neubert, Aschaffenburg (DE); Marcus Zinn, Rodgau (DE)

(73) Assignee: SCHNEIDER ELECTRIC AUTOMATION GMBH, Marktheidenfeld (DE)

( * ) Notice: Subject to any disclaimer, the term of this patent is extended or adjusted under 35 U.S.C. 154(b) by 515 days.

(21) Appl. No.: 14/362,316

(22) PCT Filed: Dec. 17, 2012

(86) PCT No.: PCT/EP2012/075853
§ 371 (c)(1),
(2) Date: Jun. 2, 2014

(87) PCT Pub. No.: WO2013/087940
PCT Pub. Date: Jun. 20, 2013

(65) Prior Publication Data
US 2014/0337521 A1    Nov. 13, 2014

(30) Foreign Application Priority Data
Dec. 16, 2011   (DE) .................. 10 2011 056 524

(51) Int. Cl.
*H04L 12/24* (2006.01)
*H04L 29/08* (2006.01)
*H04L 12/26* (2006.01)

(52) U.S. Cl.
CPC .............. *H04L 41/50* (2013.01); *H04L 43/08* (2013.01); *H04L 67/02* (2013.01); *H04L 67/22* (2013.01); *H04L 67/28* (2013.01)

(58) Field of Classification Search
None
See application file for complete search history.

(56) References Cited

U.S. PATENT DOCUMENTS

| 7,305,431 B2 | 12/2007 | Karnik et al. |
| 2004/0064557 A1* | 4/2004 | Karnik .................. G06F 9/5055 709/225 |

(Continued)

FOREIGN PATENT DOCUMENTS

WO    2009047201 A1    4/2009

OTHER PUBLICATIONS

Wenli Dong, et al. :"QoS-Aware Web Service Composition Based on SLA", Natural Computation, 2008. ICNC '08. Fourth International Conference on, IEEE, Piscataway, NJ, USA, Oct. 18, 2008, pp. 247-251.

(Continued)

*Primary Examiner* — Natisha Cox
(74) *Attorney, Agent, or Firm* — Ladas & Parry LLP

(57) ABSTRACT

A method for evaluating use of a service and/or function provided by an automation component. To implement an evaluation of a use of the service and/or functions of the automation component with little hardware complexity, a web service is called by a web service call, the web service call or a function call generated by the web service is recognized by means of a recognition module implemented in the automation component, service and/or function information that regards the called service and/or function and that is contained in the web service call or the function call is read out by means of the recognition module, the web (Continued)

Figure 1:
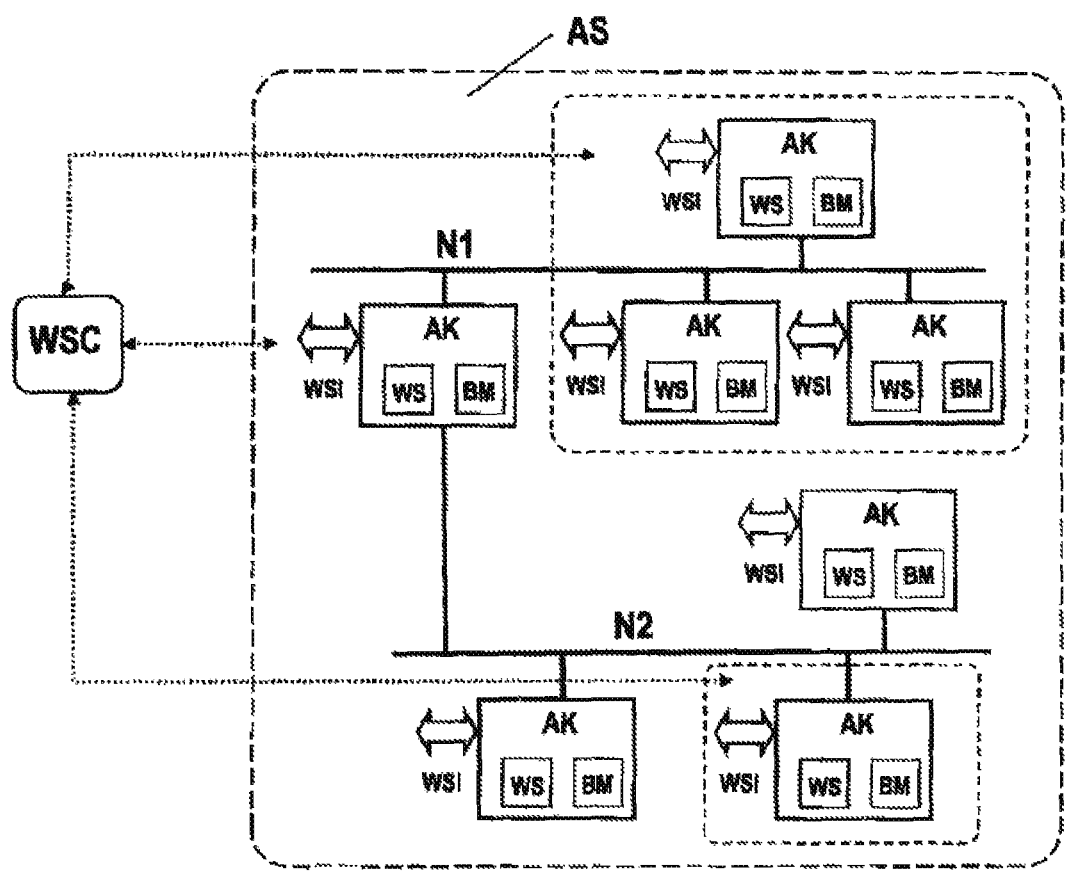

service is executed after release, service- and/or function-specific data are detected by means of a detection module during the execution of the web service, and the service and/or function provided by the automation component is evaluated.

38 Claims, 15 Drawing Sheets

(56) References Cited

U.S. PATENT DOCUMENTS

| | | | |
|---|---|---|---|
| 2007/0061018 A1 | 3/2007 | Callaghan et al. | |
| 2007/0147240 A1* | 6/2007 | Benveniste | H04W 28/24 |
| | | | 370/230 |
| 2009/0254893 A1* | 10/2009 | Ahuja | G06F 8/49 |
| | | | 7/152 |
| 2014/0157063 A1* | 6/2014 | Bird | G06F 11/008 |
| | | | 714/47.3 |

OTHER PUBLICATIONS

International Search Report mailed Apr. 2, 2013, corresponding to International Patent Application No. PCT/EP2012/075853.
Stefan Supke.: "Abrechnung von Web Service Diensten", Oct. 1, 2003, URL: http://eris.prakinf.tu-ilmenau.de/edu/HS/SS2003/Suepke03Abrechnung.pdf.
Agarwal, V. et al.: "Architectural Issues of Metering and Accounting of Grid Services" IBM Research Report, RI020101, IBM India Research Lab., New Delhi, 2002

* cited by examiner

EVALUATION OF USE OF A SERVICE AND/OR FUNCTION PROVIDED OR CALLED BY A WEB SERVICE

This application is a 371 of PCT/EP2012/075853, filed on Dec. 17, 2012, which claims priority to German Application No. 102011056524.8, filed Dec. 16, 2011.

The invention relates to a method for assessing a use of a service and/or function provided or called by a web service, comprising the process steps: recognizing a web service call, capturing information regarding the service and/or function provided or called by the web service, and assessing the use of the service provided or called and/or on the basis of parameters and the captured information, as well as to an automation component, such as control apparatus, measurement apparatus, HMI or SCADA, comprising a process execution module for the performance of a service and/or function.

U.S. 7,305,431 B2 relates to a method for allowing an automatic enforcement of service level agreements in a client-server network. Here, calls of services and the provision of resources of a server on which the services are hosted are measured on the basis of the service level agreement, the currently available resources, and the needs of the user. In this method, the web services are hosted on a single server, wherein the services are called by a plurality of clients via a network. The service level agreements are stored in a database of the server.

In an article by Agarwal, V. et al.: "Architectural Issues of Metering and Accounting of Grid Services" IBM Research Report, RI020101, IBM India Research Lab., New Delhi, 2002, several architectures for capturing and charging for the use of grid resources are described. A monitoring component is proposed which acquires data in connection with the use of the services. The monitoring function can be implemented either in each service or by using an external monitoring agent.

Moreover, a measurement component is provided, which collects the monitoring information of the current active user requests and converts them into one or more charging metrics.

According to a first model, an external central measurement service is provided. Each grid service signs on with the measurement service. For each request, the grid service sends an initiation request to the measurement service.

In a second model, the collection of monitoring information, the assessment and communication of charging values is contained in the grid service. In the process, the assessment components can be implemented either as a part of the grid service or as a separate component. The charging information is transferred from the service to the user. Each service call contains measurement specific information, such as request ID, maximum allowed use limits, etc.

In a third model, it is proposed that each grid service has an exclusive measurement component with its own interface. The service call and the flow of measurement information take place over separate paths.

In the models known from the prior art, the grid services are hosted in one more servers, which can call a user as client via a network. The assessment-specific data is also stored centrally in a database of a server.

The charging for web services is described in a printed document by Stefan Süpke: "Abrechnung von Web-Service-Diensten [Charging for Web Service services]," Technical University Lindenau, summer semester 2003. In the known methods, a provider registers a web service in a public or private registry, such as a UDDI registry, including the associated description in WSDL (Web Service Description Language). A requester can search the registry for a service that he/she is looking for and download the WSDL description and incorporate it in his/her application according to agreed-on rules. Here, the rules that are required for the incorporation have to be already apparent in the registry. The incorporation of the web service can occur manually or automatically. However, the method requires a considerable computation capacity of the individual components.

Therefore, the described method is not suitable for assessing a use of a service and/or function provided by an automation component, if the automation component has only a low computation capacity.

Starting with this, the present invention is based on the problem of further developing a method and an automation component of the type mentioned in the introduction so that, even if the hardware resources of the automation component are meager, a local assessment of a use of the service and/or function provided by said resource is possible.

The problem is solved according to the invention in that that, among other factors, the web service which is implemented in an automation component web service and called for the performance of the service and/or function is called locally by a web service call, in that the web service call, or a function call generated by the web service, is locally recognized by means of a recognition module implemented in the automation component, in that component specific parameters for recognizing and capturing web service calls are locally stored in the form of service level agreements in a storage element of the automation components, in that a service and/or function information contained in the web service call or the function call, and relating to the called service and/or function is read out locally by means of the recognition module, and stored locally in the storage element, and compared to the stored capturing parameters, in that, in the case of conformity of a recognition parameter, the web service is approved and executed by the recognition module, in that, during the execution of the web service, service- and/or function-specific data is locally captured by means of a recognition module locally implemented in the automation component, and stored in the storage module, and in that, the service and/or function made available by the automation component is locally evaluated on the basis of the service and/or function information, the service- and/or function-specific data and the locally defined assessment parameters.

In a preferred embodiment, it is provided that the web service call is recognized and read out by a web service proxy module upstream of the web service.

Here, the web service proxy module is activated by an apparatus-specific communication interface as soon as the web service call occurs.

It is provided that the web service proxy module reads out and preprocesses the service and/or function information contained in the web service call, and subsequently starts the corresponding web service.

In order to respond to the web service call, it is provided that the web service, after the execution of the function call, sends back a result to the web service proxy module, and in that the web service proxy module responds to the web service call.

According to an alternative embodiment of the method, it is provided that the web service call is recognized by a hardware-based recognition module integrated in a communication interface and upstream of the web service, and in that the service and/or function information contained in the web service call is read out by measuring physical signals transmitted by the communication interface.

Here, a web service protocol is used for the web service call, which contains the service and/or function information in a transport protocol and/or a message protocol distributed over the two protocol types of the web service protocol.

An additional alternative embodiment of the method is characterized in that the web service call is recognized and read out by a recognition module integrated in the web service, and in that the read-out information is transmitted to a capturing module integrated in the web service or unequivocally associated with the web service.

It is also possible for the recognition of the web service call to occur indirectly by the recognition of a function call, which is directed by the web service to the process execution module, in the automation component, and in that the actions executed by the function call are captured by the capturing module.

In the preferred embodiment, the recognition and capturing occur by means of a web service proxy module downstream of the web service, wherein a message flow from the web service to the process execution module is interrupted by the web service proxy module before forwarding the message, and in that the message is changed if applicable by the web service proxy module.

An automation component according to the invention is characterized by, among other factors, the fact that, in the automation component, at least one web service is implemented, comprising a web service interface for receiving a web service call as well as an interface for transmitting a function call to the process execution module for the performance of the service and/or function, in that, in the automation component, an assessment module is implemented, comprising a configurable storage module, in which component-specific parameters for the recognition and assessment of the web service calls can be stored locally, a recognition module, which is connected to the web service interface or the web service output, for recognizing a service and/or function information contained in the web service call or the function call, as well as, for the approval of the performance of the web service and/or the function setup, a capturing module which is connected to the process execution module, to the recognition module as well as to the storage element, for capturing service- and/or function-specific data during the execution of the web service and for the assessment of the service and/or function provided by the automation component, on the basis of the service and/or function information of the locally captured service- and/or function-specific data as well as of the locally configured and stored use parameters.

In a preferred embodiment, the assessment module can be designed as at least one web service proxy module upstream of the web service. The assessment module includes a recognition module, which can be implemented as a software component in a communication stack of the web service proxy module.

For storing configurable use parameters, the automation component can have a storage module. Here too, the possibility exists to store the use parameters externally.

According to an additional embodiment, the recognition module can be designed as a hardware/software component integrated in a communication interface of the automation component, by means of which signals transmitted via the communication interface can be measured.

An additional preferred embodiment is characterized in that the recognition module is integrated in a web service and in that the capturing module is integrated either in the web service or unequivocally associated with the web service externally as a component of the automation component.

An additional alternative embodiment is characterized in that the capturing module as well as the recognition module is downstream of the web service and in that the function calls of the web service are monitored. Here, the recognition module and the capturing module are designed as hardware/software module. The possibility also exists to integrate the recognition module and/or the capturing module in a web service proxy module downstream of the web service.

In the interaction of web service based services and/or functions with automation and measurement apparatuses that are incorporated, for example, via a gateway or directly into a network and that directly or indirectly exchange information via web service, the invention provides a rule-based method for a dedicated recognition and capturing of a service and/or function, which is provided directly with the use and/or with the call of the web service made available by automation and measurement apparatuses.

In particular, for the use of one or more web services for data exchange, diagnosis, or remote maintenance, for example, in cloud-based systems or within an automation system, a recognition and capturing, which is rule-based and unequivocally identifiable for the respective apparatus, of services and/or functions integrated therein is made possible.

The services and/or functions can be configured and controlled via established parameters, for example, service level agreements.

Additional details, advantages and features of the invention result not only from the claims, the features that can be obtained—individually and/or in combination—from said claims, but also from the following description of a preferred embodiment.

Figure 2:
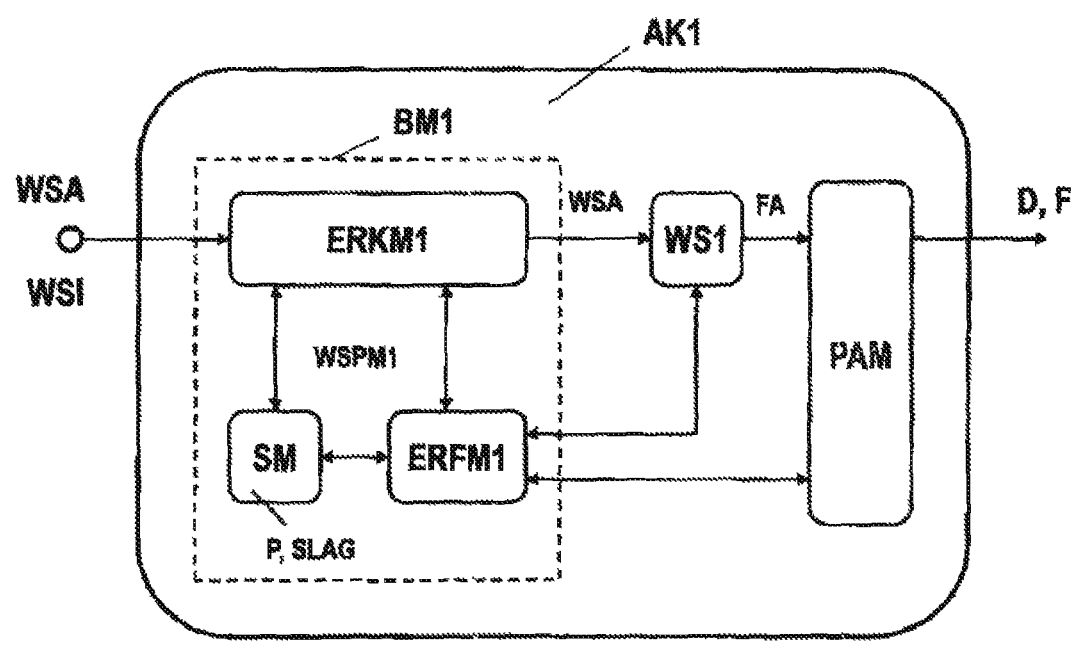
Figure 3A:
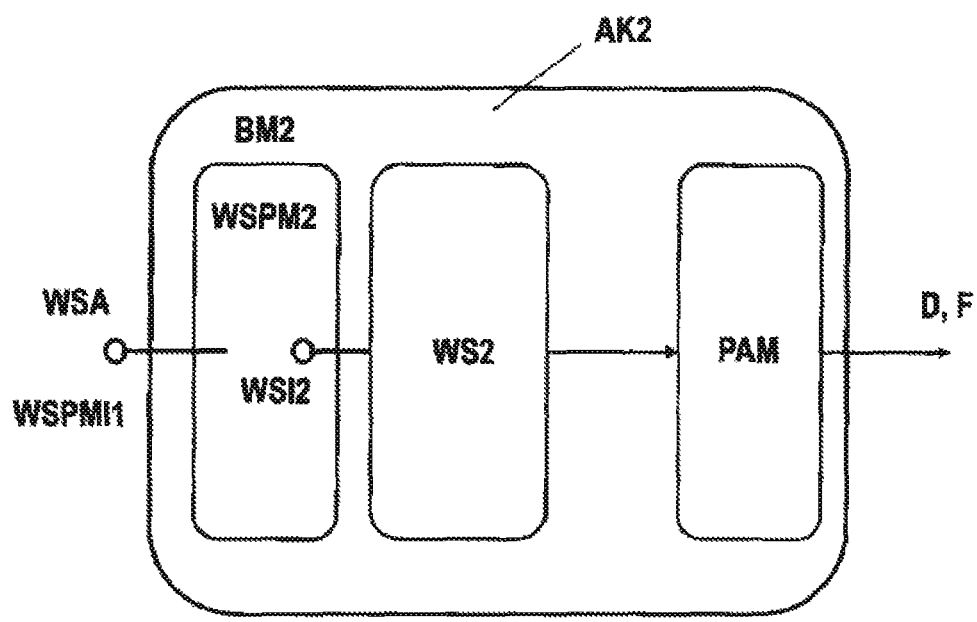
Figure 4:
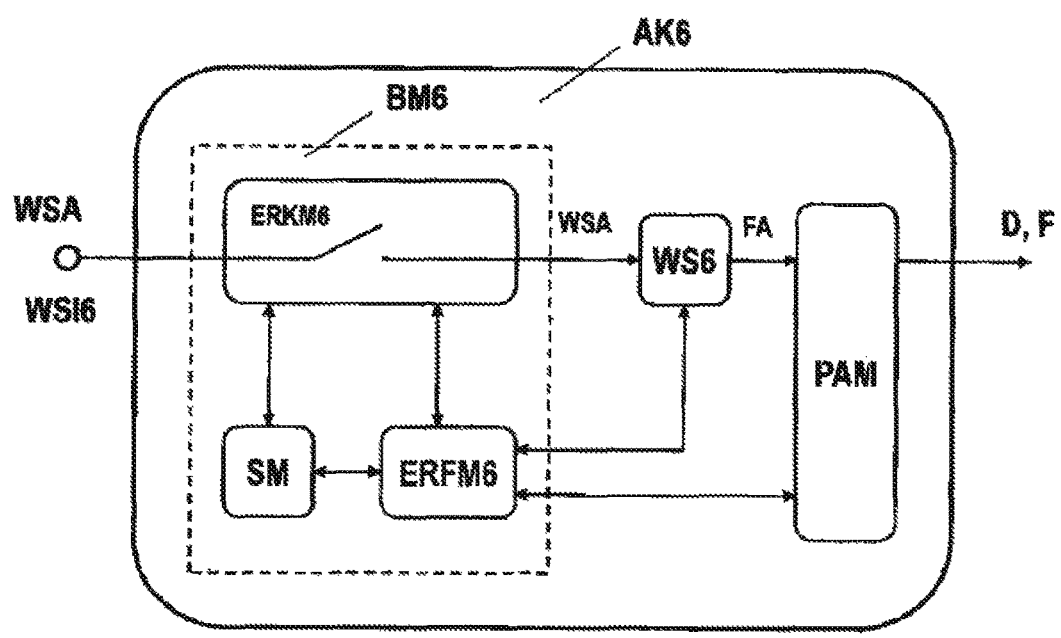
Figure 5:
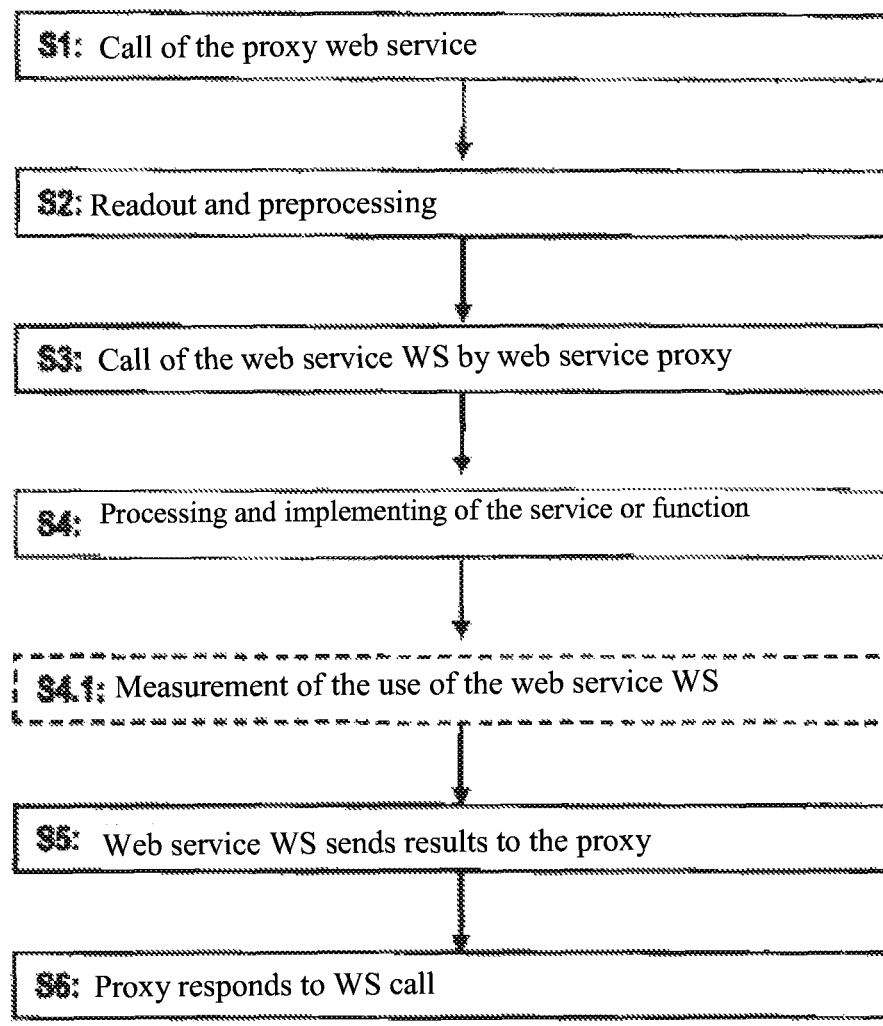
Figure 6:
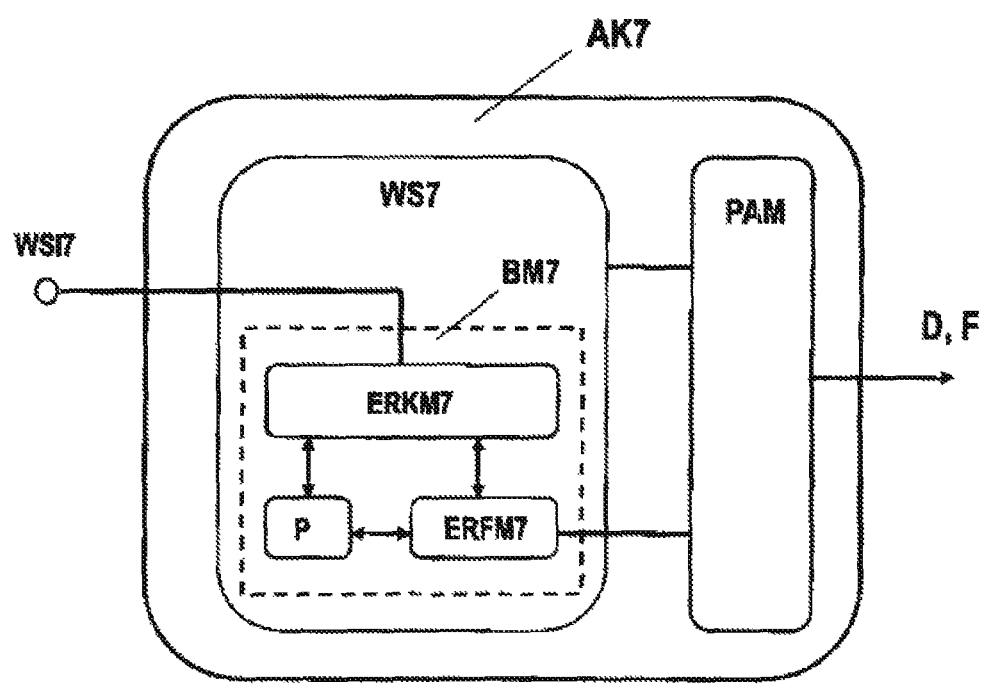
Figure 7:
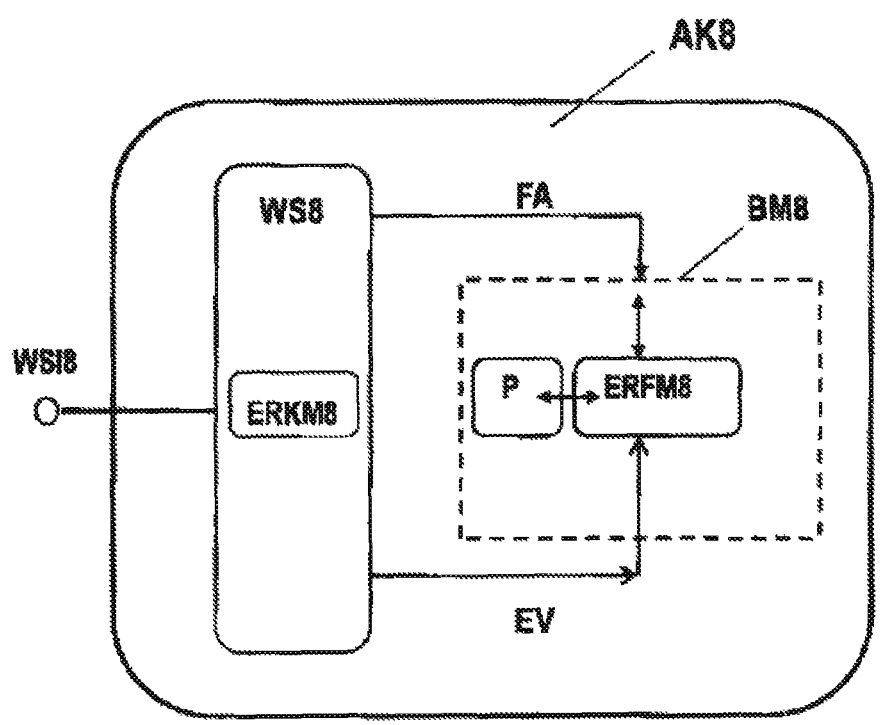
Figure 8:
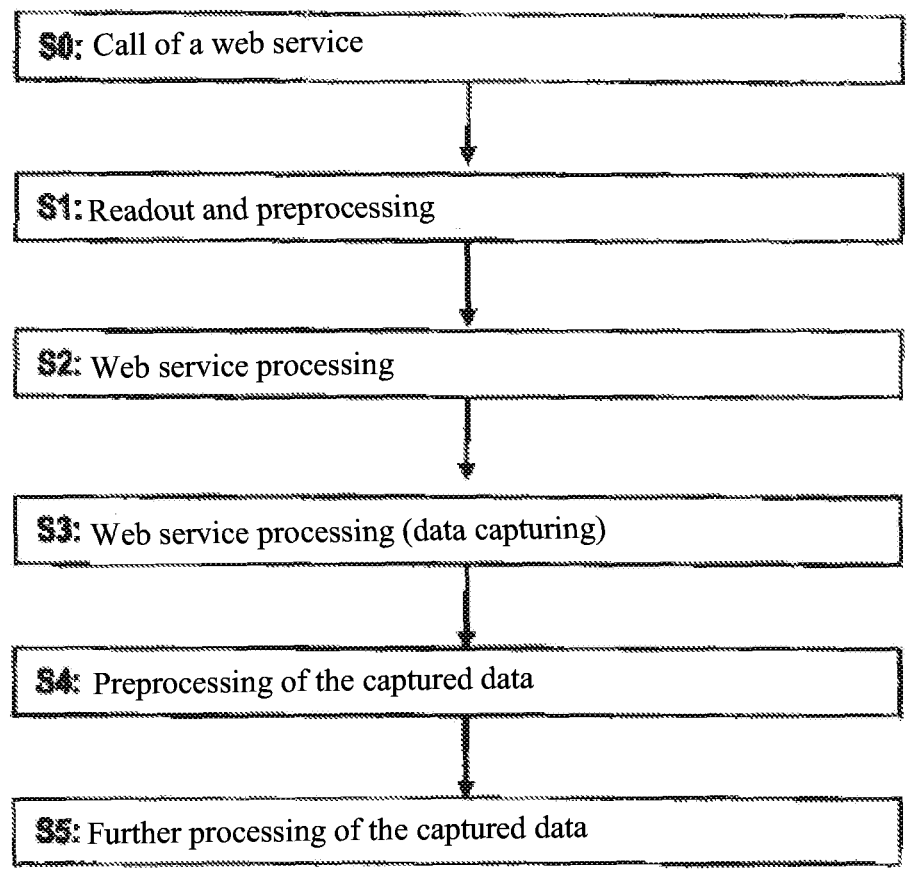
Figure 9:
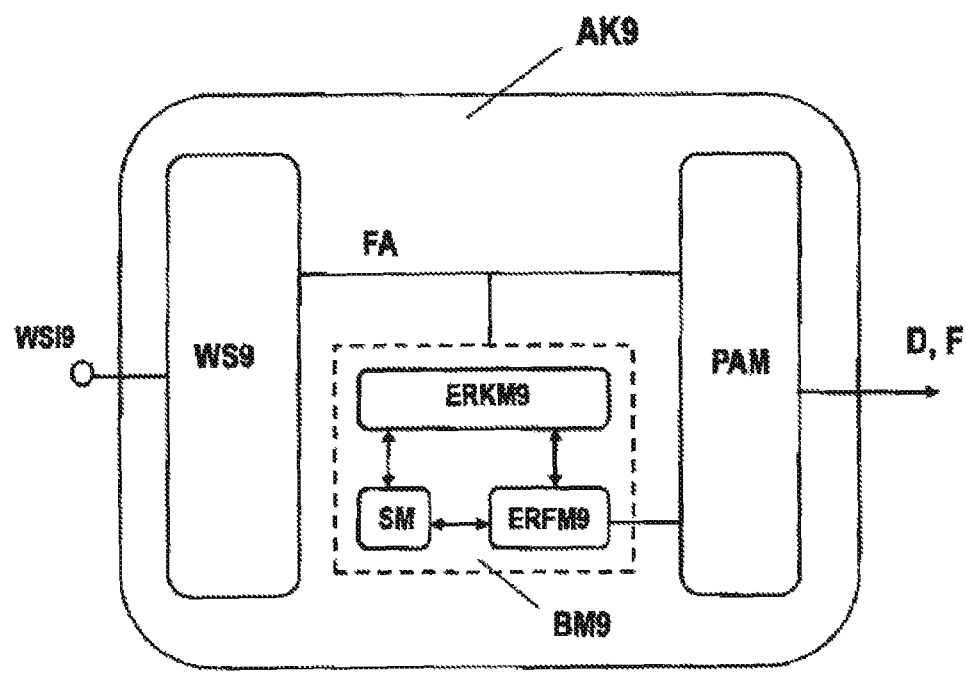
Figure 10:
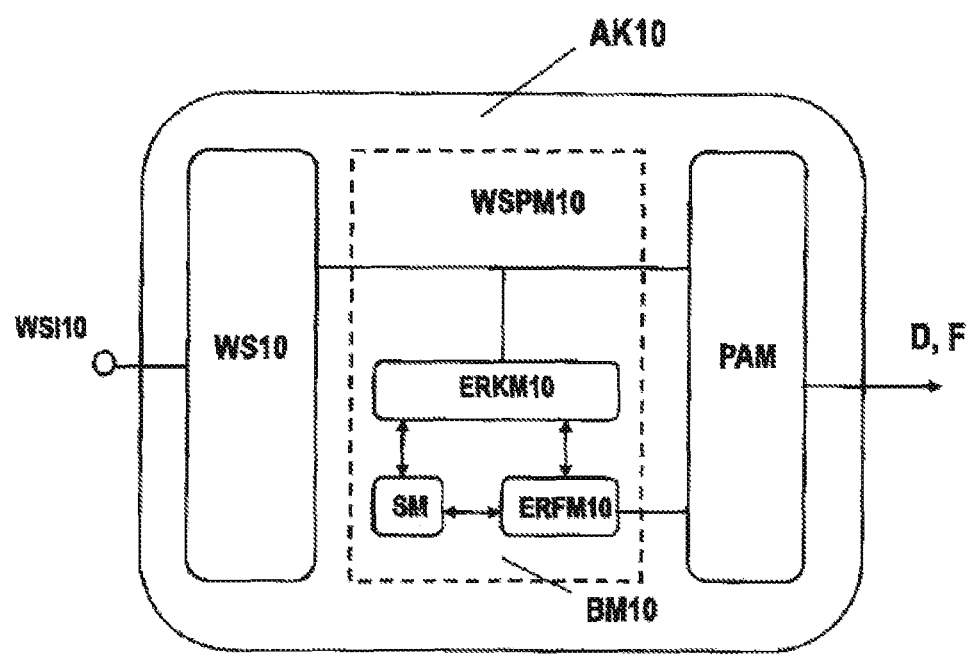
Figure 11:
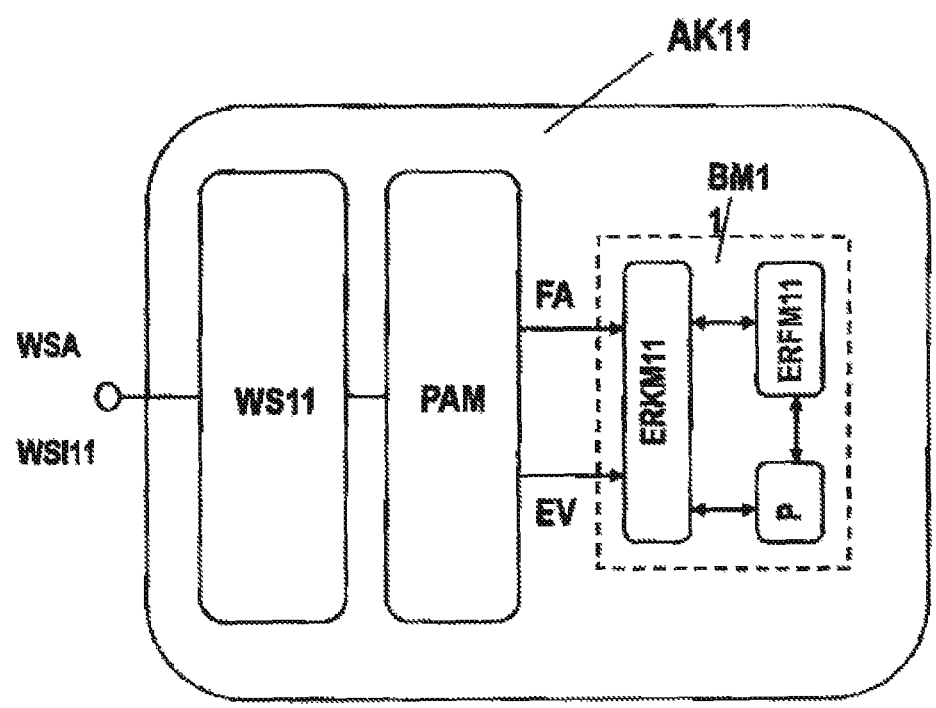
Figure 12:
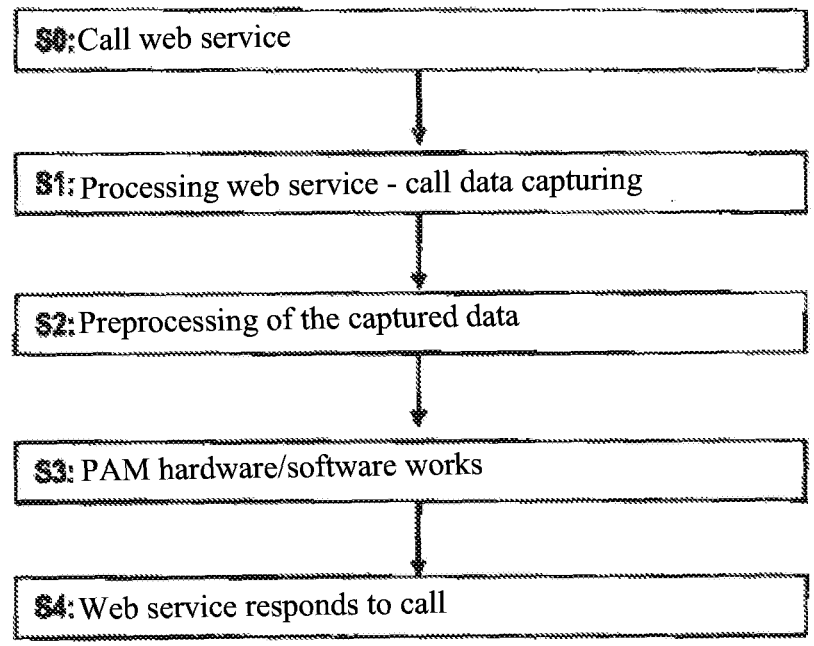
Figure 13A:
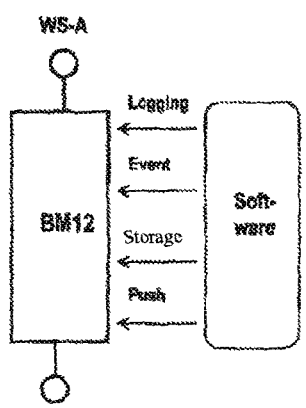
Figure 13B:
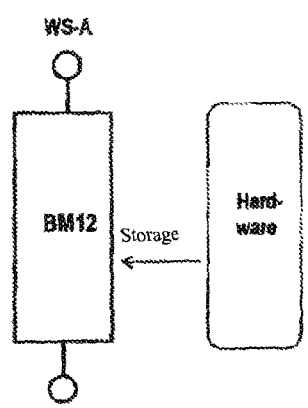
Figure 13C:
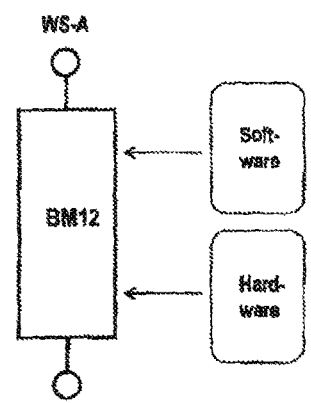

FIG. 1 shows a diagrammatic representation of an automation system with automation components whose functions can be called via web services, FIG. 2 shows a diagrammatic representation of an automation component with a first embodiment of an upstream recognition of web service calls, FIGS. 3a)-3d) show a diagrammatic representation of components with additional embodiments of an upstream recognition of web service calls, FIG. 4 shows a diagrammatic representation of an automation component with an upstream hardware-based recognition of web service calls, FIG. 5 shows a diagrammatic representation of a method for upstream recognition of web service calls, FIG. 6 shows a diagrammatic representation of an automation component with a first embodiment of a web service integrated recognition and capturing of web service calls, FIG. 7 shows a diagrammatic representation of an automation component with a second embodiment of an integrated recognition and capturing of web service calls, FIG. 8 shows a diagrammatic representation of a method for web service integrated recognition and capturing of a web service call, FIG. 9 shows a diagrammatic representation of an automation component with a first embodiment of a downstream recognition and capturing of web service calls, FIG. 10 shows a diagrammatic representation of an automation component with a second embodiment of a downstream recognition and capturing of web service calls, FIG. 11 shows a diagrammatic representation of an automation component with a third embodiment of a downstream recognition and capturing of web service calls, FIG. 12 shows a diagrammatic representation of a method for downstream web service based recognition and capturing of a web service call, and FIGS. 13a-13c) show embodiments of assessment modules.

FIG. 1 shows a diagrammatic representation of an automation system AS with service-oriented automation components AK in the form of, for example, control apparatuses, measurement apparatuses, input and/or data capturing units, which exchange messages in the form of web service calls WSA via a network N1, N2.

The automation components AK in each case have at least one integrated web service interface WSI, through which the web services WS implemented in the respective automation components AK, can be called, for example, by a web service client WSC.

The automation components AK in each case offer services D and/or functions F which can be called via the web service call WSA and executed via the process execution module PAM. For the recognizing of, capturing of, and finally charging for the services D and/or functions F, which are linked directly to the use and/or the call of the associated web service WS, an assessment module BM is implemented in the automation component AK.

Subsequently, rule-based methods and embodiments of assessment modules BM1-BM11 are described for a decided recognition and capturing of the services D and/or functions F.

The method is based on the idea of directly or indirectly recognizing the call of a web service WS1-WS11, and of capturing the services D and/or functions F, which are connected with the use or the call of one of the web services WS1-WS11, on the basis of defined parameters P.

For the purpose of the capturing of the specific services D or functions F represented and encapsulated by one of the web services WS1-WS11, various parameters P are defined, such as, for example, the type of service, the availability, or the duration of use. The latter can be defined in the form of Service Level Agreements (SLA), which are locally stored, for example, on an apparatus-specific basis, in a storage module SM.

According to a first embodiment, the recognition and capturing of the web service call WSA occurs even before the latter reaches the web service WS itself. This is referred to below as upstream recognition. For this purpose, the assessment module BM is implemented in such a manner that it is upstream of the web service WS.

A corresponding automation component AK1 is represented diagrammatically in FIG. 2.

The assessment module BM1 upstream of the web service WS1 includes a recognition module ERKM1 with the web service interface WSI1 for receiving the web service call WSA. The recognition module ERKM1 has access to the storage module SM, in which various parameters P are stored, for example, in the form of Service Level Agreements. The parameters are configurable. Furthermore, a capturing module ERFM1 is provided, which is communicatively connected to the recognition module ERKM1, and which also has access to the parameter P stored in the storage module SM.

The recognition module ERKM1, on the output side, is connected to an interface of the web service WS1, in order to forward the web service call WSA to the web service WS1. Via a function call FA, the web service WS1 calls up the process execution module PAM for executing the function F and/or service D.

The assessment of the service D or function F provided by the automation component AK1 on the basis of the web service call WSA can occur on the basis of the web service call WSA, which is recognized by the recognition module ERKM1, in connection with the parameters P. Alternatively, the possibility exists, after the recognition of a web service call WSA, of capturing the service D, which is linked directly to the use of the web service WSA, by means of the capturing module ERFM1, and of then carrying out an assessment of the service D that has been performed, taking into consideration the parameters P. For this purpose, the capturing module ERFM1 is connected to the process execution module PAM.

Figures 3B, 3C:
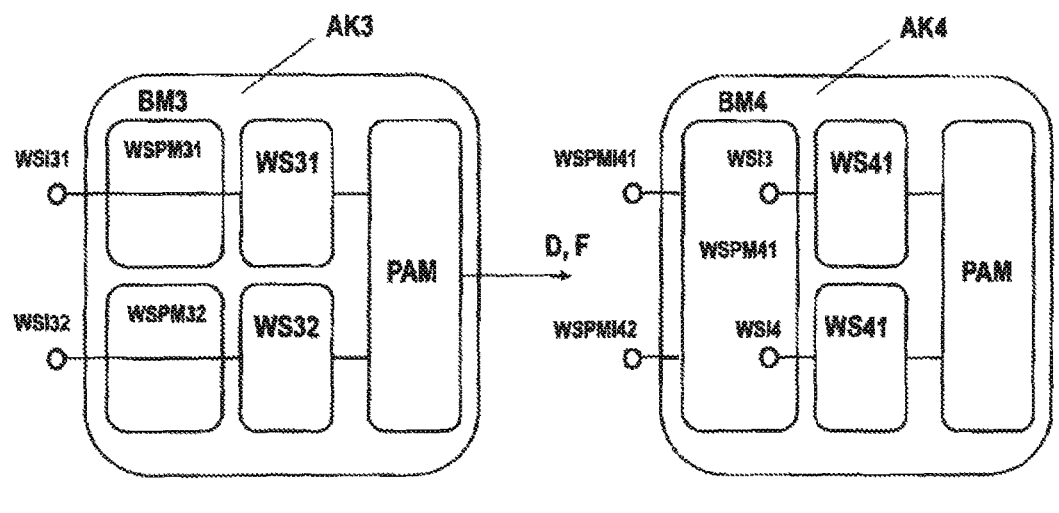
Figure 3D:
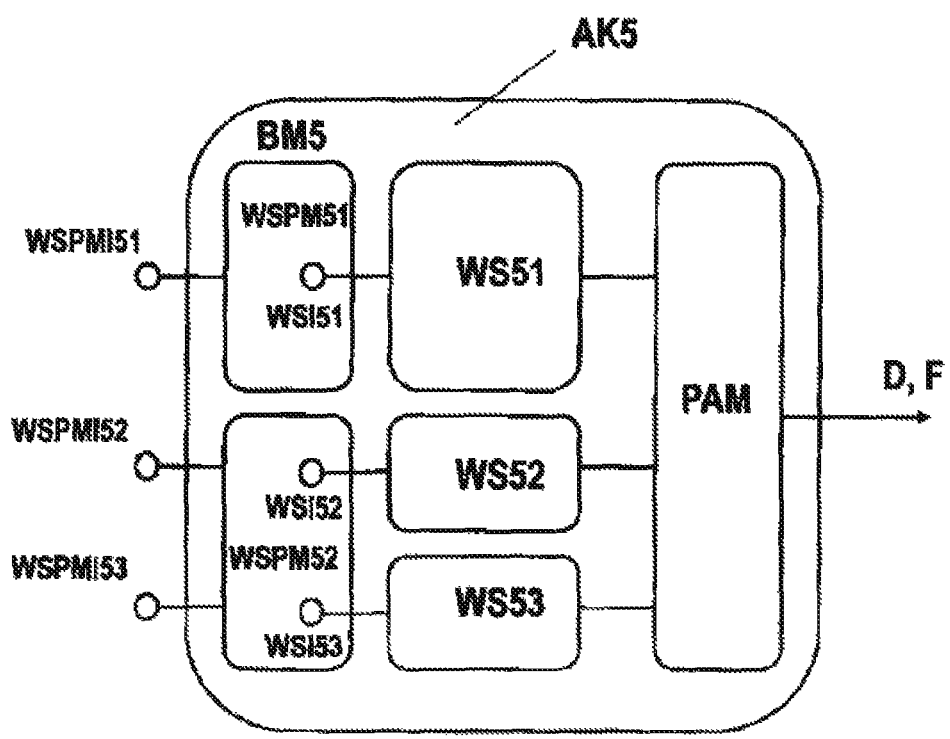

According to a preferred embodiment, the assessment module BM1 is designed as a web service proxy module WSPM1 integrated in the automation component AK1. Additional embodiments are represented in FIGS. 3 a) to 3d). The web service proxy module WSPM1 constitutes a monitoring instance, which provides one or more functions as service operations. Here, the web service proxy module WSPM1 is activated by the apparatus-specific communication interface WSI1, as soon as a web service call WSA occurs. As explained above in reference to FIG. 2, all the web service calls WSA are monitored taking into consideration the defined parameters P including an access authorization ZB.

FIG. 3 a) shows an embodiment, wherein a web service proxy module WSPM2 for a web service interface WSI2 is provided, which makes available all the functions of a web service WS2. The web service proxy module WSPM2 can also represent several web service interfaces WSI of the web service WS2.

FIG. 3 b) shows an embodiment of an automation component AK3 which has several web services WS31, WS32, each with a web service interface WSI31, WSI32, wherein for each web service WS31, WS32 in the automation component AK3, a dedicated web service proxy module WSPM31, WSPM32 is provided.

In an embodiment according to FIG. 3 c), a single web service proxy module WSPM41 with two web service interfaces WSPMI-41 and WSPMI-42 is provided for the web services WS41, WS42.

FIG. 3 d) shows an embodiment of an automation component AK5, which comprises the web services WS51, WS52, WS53. This embodiment comprises both a single web service proxy module WSPM51 and also a cumulative web service proxy module WSPM52 for the web services WS52 and WS53.

FIG. 4 shows an embodiment of an automation component AK6 comprising an assessment module BM6, which is designed as a hardware-software module upstream of a web service WS6. The assessment module BM6 is implemented in the automation component AK6. By means of the assessment module BM6, an integrated monitoring of a communication interface WSI6 of the web service WS6 is achieved. The parameters P for the assessment of the service D are stored in the storage module SM of the automation component AK6 or of the assessment module BM2. Additionally, a monitoring of an access authorization, for example, of a specific web service call WSA, can occur.

In the embodiment represented in FIG. 4, a recognition of messages in the web service call WSA occurs by monitoring the communication interface WSI6 by means of the recognition module ERKM6. The further processing of the messages occurs in the capturing module ERFM6, before the web service WS6 itself is called or further processed. In contrast to the embodiment according to FIGS. 2 and 3, the assessment module BM6 is integrated in the communication interface WSI6 and it monitors the accesses to the web service WS6. In this embodiment, a change of the web service messages is not possible. The monitoring of the communication interface WSI6 occurs here by physical measurement and assessment of electrical signals that are transmitted via the interface.

A third variant of the upstream recognition and capturing of web service calls WSA is based on an enlargement of a web service protocol WSP used. This is defined for the capturing of web service calls WSA. The web service protocol WSA can be integrated in one of the upstream web service protocol modules WSPM1-WSPM6 and/or in the hardware-side assessment module BM6. A web service message can be contained in the one transport protocol, the one message protocol, or distributed over the two protocol types. Thus all the information is predetermined, since it is entered by a user.

FIG. 5 is a purely diagrammatic representation of a course of a process for recognizing, capturing and further processing web service calls WSA.

In a first process step S1, the web service proxy module WSPM is first called by web service call WSA. The web service call WSA contains information on the requested service, information which is read out and preprocessed in process step S1. Possible information carriers are, for example, the transport protocol or the message protocol. The web service call itself can also represent information.

In a further process step S3, the web service WS itself is called by the web service proxy module WSPM, wherein, within the web service WS, the transmitted information is transmitted to a data model specific for the web service WS.

Subsequently, in a process step S4, the implementation of the function call by the web service WS occurs. In this process step S4, a measurement of the use of the requested service D can also occur optionally by means of the capturing module ERFM.

From the information on the service and/or functions and from the captured use data, information on use is generated, which is directly connected to the corresponding web service or to the service rendered by the web service WS.

In a further process step S5, the information on use is sent to the web service proxy, which, in a process step S6, replies to the web service call or carries out a change of the web service call WSA.

FIG. 6 shows an embodiment of an automation component AK7, wherein an assessment module BM7 is integrated as part of an application or control software within a web service WS7. Thus, in the case of the integrated recognition and capturing within the web service WS7, for example, as part of an application or control software, corresponding web service calls WSA are monitored by a recognition module ERKM7. Information determined by the recognition module ERKM7 can then be used further. The assessment module BM7 includes a capturing module ERFM7 which is configurable with regard to defined parameters P that are the basis of the recognition and capturing of the use of the respective web service WS7.

In the case of the automation components AK7, an instance of the capturing module ERFM7 is integrated directly in the web service WS7. The protocols directed to the web service WS7 are usually subdivided into transport protocol and message protocol. Independently of the respective protocol, the information regarding the integrated recognition and capturing of web service calls WSA is contained in the messages, so that the web service WS7 can access this information within its own instance.

In FIG. 7, an alternative automation component AK8 is represented, wherein, in a web service WS8, a recognition module ERKM8 is integrated and a capturing module ERFM8 is unequivocally associated externally. The recognition module ERKM8 is designed as an instance that is part of the application and it monitors the internal calls within the web service WS8. The capturing module ERFM8 can be configured in order to monitor the function calls FA.

As soon as the web service WS8 starts the internal implementing, the latter is captured by the capturing module ERFM8. The web service WS8 automatically sends a communication with the corresponding information, which the recognition module ERKM8 has read out beforehand from the message and/or transport protocol.

In this embodiment, a web service protocol is defined, which makes it possible to convey additional information that can be used for the capturing and charging. The web service WS8 works on messages contained in the transport protocol or message protocol directly in its own instance. However, the protocols used are not conventional protocols, instead they involve the enlargement of conventional protocols, such as, for example, HTML or SOAP with enlargement for the above-described method.

FIG. 8 purely diagrammatically shows a process sequence for the web service-integrated recognition, capturing and further processing of web service calls. After a web service call WSA in process step S0, in a process step S1 a readout of service information from the web service call occurs. The service information can be contained, for example, in a transport protocol, a message protocol and/or in the web service call itself.

In a following process step S2, for example, within the web service WS7, the received service information is transmitted to a data model specific for the web service WS7.

Then, in process step S3, the implementing of the functional call FA by the web service WS7 occurs, wherein the required service is performed by the automation component AK7. Optionally, a measurement of the use of the service can occur.

Subsequently, in a process step S4, the captured data are preprocessed, wherein, from the determined service information, such as, for example, the type of service and the captured use data, information on use is generated, that is directly connected to the corresponding web service.

In an additional process step S5, further processing of the data captured occurs, wherein the service information and/or use information is forwarded to the capturing module ERFM7, ERFM8 and further processed in said module. The capturing module ERFM7 is integrated in the web service WS7, while the capturing module ERFM8 is implemented outside of the web service WS7.

The web service WS7, WS8 calls the capturing module ERFM7, ERFM8 and uses its response as single recipient, in order to initiate the further processing with the function call FA itself. The capturing module ERFM7 and the capturing module ERFM8 are associated with the web service WS7 and WS8, respectively.

FIG. 9 shows an embodiment of an automation component AK9, wherein the recognition and capturing of web service calls WSA are carried out by an assessment module BM9, which is downstream of a web service WS9. The assessment module BM9 is implemented in a software application itself or in a hardware module PAM of the automation component AK9 together with the web service WS9.

In the embodiment example of the automation component AK9, which is represented in FIG. 9, the web service WS9 monitors function calls FA directed to the process execution module PAM by means of a recognition module ERKM9. For this purpose, a communication or data access architecture is implemented, which provides information or events for the recognition module ERKM9. The communication or data access architecture is configurable, wherein the access can be restricted depending on configuration and authorization. The assessment module BM9 has a structure as represented in FIG. 2.

FIG. 10 shows an embodiment of an automation component AK10, wherein a web service proxy WSPM10, as assessment module BM10, is located downstream of the web service WS10 itself. In a web service call WSA, which results within the apparatus in additional web service calls, capturing of the web service calls is carried out, taking into consideration parameters P, by means of a recognition module ERKM10 and a capturing module WRFM10. The capturing module ERFM10 is adapted to the different circumstances of the internal apparatuses.

In contrast to the embodiment represented in FIG. 9, the message flow is interrupted by the assessment module BM10, which is designed as web service proxy, before the forwarding to the process execution module PAM is interrupted, and if applicable it can change the communication. Thus, starting with the assessment module BM10, specific messages can be forwarded depending on the sent message.

FIG. 11 shows an embodiment of an automation component AK11, wherein a monitoring of the process execution module PAM, which is called by the web service WS11, carried out by an assessment module BM11. Function calls FA or data accesses, which are triggered by the web service call WSA, are monitored on the hardware side and/or software side by the assessment module BM11. In contrast to the embodiments according to FIGS. 9 and 10, the web service calls or their messages are not monitored directly, rather they are monitored indirectly via the activities of the process execution module PAM or a specific part of the automation components, which are called functionally by the web service WS, either directly or indirectly.

Independently thereof, combinations of the embodiments represented in FIGS. 9, 10 and 11 can also be used. For example, it is possible to implement an embodiment in which the assessment module BM10, designed as web service proxy WSPM, is combined in combination with the assessment module BM11 represented in FIG. 11. In this embodiment, in the case of a web service call WSA, the assessment module BM10 will start the assessment module BM11. As a result, the advantage is achieved that, for example, the energy consumption of the assessment module BM11 is reduced, a consumption which otherwise would be generated due to the continuous monitoring of the process execution module. In this embodiment, a communication connection between the assessment module BM10 and the assessment module BM11 is provided, in order to implement a direct or indirect communication between the modules.

FIG. 12 shows, in a diagrammatic representation, a process sequence, which is implemented by the embodiments— shown in FIGS. 9 to 11—of automation components AK9-AK11 and capturing modules.

After a web service call in process step S0, the processing of the web service call occurs in a process step S1, wherein the web service WS implements the function call. In a process step S2, the captured data are captured by the downstream capturing module ERFM.

Then, in the process step S3, the service is implemented by the process execution module.

After implementing the service by the process execution module PAM, the web service call WSA is answered in a process step S4.

FIGS. 13 a) to 13 c) show configurations of an assessment module BM12, by means of which an assessment of the captured web service calls WSA can be implemented at different times. The points in time can here be configured accordingly.

An assessment to determine whether a web service call WSA is relevant for charging for a service D is carried out by the recognition module ERKM (monitoring instance) implemented in the assessment module BM12 as described above. Incoming web service calls WSA are registered and assessed at the time of input.

An assessment can also occur as soon as a result of a function call FA is available, which was initiated by the respective web service WS.

An additional possibility of assessment is achieved by recording the triggered function calls or the hardware accesses (FIG. 13 b)).

A combination of the above methods is also possible, wherein, as a result of an upstream recognition of web service calls, a downstream recognition is started, which is then configured with the information specified by the parameters P (FIG. 13 c)).

The decision whether relevant accesses corresponding to the configured capturing parameters are present can be made by different methods that are explained in connection with FIG. 13 a) to FIG. 13 c).

FIG. 13 a) shows, for example, the definition and the use of specific events or key words in the call or at the time of the access to data and functions by software. A monitoring of the stored data by means of a hardware component HK is represented in FIG. 13 b). FIG. 13 c) shows a combination of the methods shown in FIGS. 13 a) and 13 b).

For an assessment of a service D performed or of a web service call, the following data can be used as basis:
  Start and end of web service call WSA,
  Start and end of web service function call FA,
  Start and end of a call of other libraries or functions (software),
  Start and end of a hardware call as well as values within function results.

The methods according to the invention allow, in particular, rule based recognition and capturing, which are identifiable unequivocally for the respective automation component, of services integrated therein, in particular for the use of one or more web services for data exchange, diagnosis or remote monitoring, for example, in cloud-based systems or within an automation system.

The services are configured and controlled via fixed parameters, for example, service level agreements.

Thus, direct recognition and capturing of the service represented by the respective web service become possible as soon as the web service is integrated in an automation component, such as automation apparatus, measurement apparatus or sensor. The parameters are configurable for the capturing and the assessment of the web services used.

The invention claimed is:

1. Method for assessing a use of a service (D) and/or function (F) provided or called by a web service (AK1; . . . ; AK11), comprising the process steps:
recognizing a web service call (WSA),
recognizing information concerning the service (D) and/or function (F) provided or called by the web service (WS1 . . . ; WS11), and
assessing the use of the service (D) and/or (F) provided or called, on the basis of parameters and the information captured,
characterized in that
the web service (WS1; . . . ; WS11) is implemented in an automation component (AK1; . . . ; AK11), and the web service (WS1; . . . ; WS11) is called locally for the performance of the service (D) and/or function (F) by a web service call (WSA),
in that the web service call (WSA) or a function call (FA) generated by the web service (WS1; . . . ; WS11) is locally recognized by means of a recognition module (ERKM1; . . . ; ERKM11) implemented in the automation component (AK1; . . . ; AK11),
in that component-specific parameters (P, SLAG) are stored for the recognizing and capturing of web service calls (WSA) in the form of service level agreements locally in a storage element (SM) of the automation components (AK1; . . . ; AK11),
in that service and/or function information concerning the called service (D) and/or function (F) and contained in the web service call (WSA) or in the function call (FA) is locally read out by means of the recognition module (ERKM1; . . . ; ERKM11) and locally stored in the storage element (SM) and compared to the stored capturing parameters,
in that the web service (WS1; . . . ; WS11) in the case of conformity of a recognition parameter is approved and performed by the recognition module (ERKM1; . . . ; ERKM11),
in that, during the performance of the web service (WS1; . . . ; WS11), service and/or function-specific data is captured by means of a capturing module (ERFM1; . . . ; ERFM11) locally implemented in the automation component, and stored in the storage module (SM), and
in that the service (D) and/or function (F) provided by the automation component (AK1; . . . ; AK11) is(are) locally assessed on the basis of the service and/or function information, of the service- and/or function-specific data, and of the locally defined assessment parameters.

2. Method according to claim 1,
characterized in that
the web service call (WSA) is recognized and read out by a web service proxy module (WSPM1; . . . ; WSPM5) upstream of the web service (WS1; . . . ; WS7).

3. Method according to claim 2,
characterized in that
the web service proxy module (WSPM1; . . . ; WSPM5) is activated by an apparatus-specific communication interface, as soon as the web service call occurs.

4. Method according to claim 1,
characterized in that
the web service proxy module (WSPM1; . . . ; WSPM5) reads out and preprocesses the service and/or function information contained in the web service call (WSA), and subsequently starts the corresponding web service (WS1; . . . ; WS7).

5. Method according to claim 1,
characterized in that,
after the execution of the function call (FA), the web service (WS1; . . . ; WS7) sends back a result to the web service proxy module (WSPM1; . . . ; WSPM5), and in that the web service proxy module (WSPM1; . . . ; WSPM5) responds to the web service call (WSA).

6. Method according to claim 1,
characterized in that
the web service call (WSA) is recognized by a hardware-based recognition module (ERKM6) integrated in a communication interface and located upstream of the web service, and in that the service and/or function information contained in the web service call (WSA) is read out by measuring physical signals transmitted via the communication interface.

7. Method according to claim 1,
characterized in that
for the web service call (WSA), a web service protocol is used, which contains the service and/or function information in a transport protocol and/or in a message protocol and/or distributed over the two protocol types of the web service protocol.

8. Method according to claim 7,
characterized in that,
the web service protocol is implemented in the upstream web service proxy module (WSPM1; . . . ; WSPM5) or in the hardware-based recognition module (ERKM2).

9. Method according to claim 1,
characterized in that
the web service call (WSA) is recognized and read out in the recognition module (ERKM7, ERKM8) integrated in the web service (WS7; WS8), and in that the read out information is transmitted to a capturing module (ERFM8) integrated in the web service (WS7) or unequivocally associated with the web service (WS7; WS8).

10. Method according to claim 1,
characterized in that
during the performance of the web service (WS7, WS8), the service- and/or function-specific data is captured by the capturing module (ERFM7) integrated in the web service (WS7).

11. Method according to claim 1,
characterized in that
the web service (WS7) accesses, within its own instance, the service and/or function information contained in the web service protocol.

12. Method according to claim 1,
characterized in that
the capturing module (ERFM8) monitors internal web service calls within the respective web service (WS8), and, after the performance of the web service (WS8) it captures the implementing thereof, wherein the web service (WS8) automatically sends a communication with the service and/or function information, which the recognition module (ERKM8) has read out beforehand from the message and/or transport protocol.

13. Method according to claim 1,
characterized in that
the web service (WS7, WS8) calls the capturing module (ERFM7, ERFM8) and uses its response as sole recipient, and it starts the further processing with the actual function call (FA) in the automation component (AK).

14. Method according to claim 1,
characterized in that
the recognition of the web service call(WSA1) occurs indirectly by the recognition of a function call (FA) from the web service (WS9) to the process execution module (PAM), in the automation component (AK), and in that the actions performed by the function call (FA) are captured by the capturing module (ERFM9, ERFM10).

15. Method according to claim 1,
characterized in that
a communication and/or data access architecture is provided, which provide(s) the service and/or function information or events for the capturing module (ERFM9).

16. Method according to claim 1,
characterized in that
the recognition and capturing occur by means of a web service proxy module (WSPM10) downstream of the web service (WS10).

17. Method according to claim 1,
characterized in that
a message flow from the web service (WS10) to the process execution module (PAM) is interrupted by the web service proxy module (WSPM10) before the message is forwarded, and in that the message is if applicable changed by the web service proxy module (WSPM10).

18. Method according to claim 1,
characterized in that
the function calls (FA) and/or data accesses to the process execution module (PAM) are monitored by means of the capturing module (ERFM9, ERFM10) on the hardware side or software side, wherein in particular activities of the automation component or of a special part of the automation component (AK) are monitored, which are called functionally directly or indirectly by the web service.

19. Method according to claim 1,
characterized in that
the function calls (FA) and/or service- and/or function-specific data-capturing module (ERFM10) is called by the web service proxy module (WSPM10), wherein a direct or indirect communication occurs between the web service proxy module (WSPM) and the capturing module (ERFM).

20. Method according to claim 1,
characterized in that
the assessment of the captured web service calls (WSA) or function calls (FA) occurs at different times, wherein web service calls are registered and assessed at the time of the input and/or in the case of the presence of an event of the function call (FA), which was initiated by the respective web service, and/or by recording of the triggered function calls (FA) or hardware accesses.

21. Method according to claim 1,
characterized in that
the decision whether relevant web services or function calls corresponding to the configured recognition and/or assessment parameters are present, occurs by definition and use of specific events or key words in the web service or function call, or, in the case of access to data and functions, by software- and/or hardware-side monitoring of the stored data.

22. Method according to claim 1,
characterized in that
the service and/or function information is transmitted via a web service protocol, preferably a transport protocol, a message protocol and/or service and/or function information distributed over the two protocols.

23. Method according to claim 1,
characterized in that
the web service call (WSA) itself is captured as the service and/or function information.

24. Method according to claim 1,
characterized in that
the transmitted service and/or function information is transmitted within the web service (WS1; . . . ; WS11) in a data model specific for the web service (WS1; . . . ; WS11).

25. Method according to claim 1,
characterized in that
during the performance of the web service (WS1; . . . ; WS11), service- and/or function-specific data in the form of duration of use, number of function calls, values within function results, was captured.

26. Method according to claim 1,
characterized in that
the assessment of the services (D) and/or functions (F) provided by the automation component (AK1; . . . ; AK9) is configured by specification of the assessment parameters, preferably in the form of service level agreements.

27. Method according to claim 1,
characterized in that
the assessment parameters are stored in the automation component (AK1; . . . ; AK9) or in an external component.

28. Automation components (AK1; . . . ; AK11), such as control apparatus, measurement apparatus, HNI or SCADA, comprising a process execution module (PAM) for the performance of a service (D) and/or function (F),
characterized in that,
in the automation component (AK1; . . . ; AK11) at least one web service (WS1; . . . ; WS11) is implemented, comprising a web service interface (WSI) for receiving the web service call (WSA) as well as
an interface for transmitting a function call (FA) to the process execution module (PAM) for the performance of the service (D) and/or the function (F),
in that, in the automation component (AK1; . . . ; AK11), an assessment module (BM1; . . . ; BM14) is implemented, comprising
a configurable storage module (SM), in which component-specific parameters (P, LAG) for recognizing and assessing the web service calls are locally storable,
a recognition module (ERKM1; . . . ; ERKM11) connected to the web service interface or to the web service output, for recognizing service and/or function information contained in the web service call or in the function call (FA), as well as for approving the performance of the web service (WS1; . . .; WS11) and/or of the function setup
a capturing module (ERFM1; . . . ; ERFM11) connected to the process execution module, to the recognition module as well as to the storage element (SM), for capturing service- and/or function-specific data, during the performance of the web service or for assessing the service (D) and/or function (F) provided by the automation component (AK1; . . . ; AK11), on the basis of the service and/or function information of the locally captured service- and/or function-specific data as well as of the locally configured and stored use parameters.

29. Automation component according to claim 28, characterized in that
the assessment module (BM1, BM3, BM4, BM5) is designed as at least one web service proxy module (WSPM1; . . . ; WSPM5) upstream of the web service (WS1).

30. Automation component according to claim 28, characterized in that
a web service proxy module (WSPM2, WSPM31, WSPM32, WSPM51) is associated with each web service (WS2, WS31, WS32, WS51) and/or in that a web service proxy module (WSPM41) is associated with several web services (WS41, WS42).

31. Automation component according to claims 29, characterized in that
the recognition module (ERKM1; . . . ; ERKM5) is implemented as a software component in a communication stack of the web service proxy module (WSPM1; . . . ; WSPM5).

32. Automation component according to claims 28, characterized in that
the automation component (AK1 . . . AKn) comprises a storage module (SM) for storing the specific use parameters.

33. Automation component according to claims 28, characterized in that
the recognition module (ERKM6) is designed as a hardware/software component integrated in a communication interface of the automation component (AK6), by means of which signals transmitted by the communication interface can be measured.

34. Automation component according to claims 28, characterized in that
the recognition module (ERKM7, ERKM8) is integrated in the web service (WS7), and in that the capturing module (ERFM7) is integrated either in the web service (WS7) or unequivocally associated with the web service (WS7) externally as component of the automation component (AK7).

35. Automation component according to claims 28, characterized in that
the capturing module (ERKM9, ERKM10) and the capturing module (ERFM9, ERFM10) are downstream of the web service (WS9) and monitor the function calls (FA) of the web service (WS9).

36. Automation component according to claims 28, characterized in that
the capturing module (ERKM9) and the capturing module (ERFM9) are designed as hardware/software module.

37. Automation component according to claims 28, characterized in that
the recognition module (ERKM10) and the capturing module (ERFM10) are integrated in a web service proxy module (WSPM10) downstream of the web service (WS10).

38. Automation component according to claims 28, characterized in that
the assessment module (BM11) is connected as hardware/software component to the process execution module (PAM), wherein function calls (FA) and/or data accesses, which are triggered by the web service (WS11), are monitored.

* * * * *